United States Patent
Suh et al.

(10) Patent No.: US 7,603,029 B2
(45) Date of Patent: Oct. 13, 2009

(54) METHOD OF CONTROLLING AN IMAGE DATA OUTPUT OF A PORTABLE DEVICE, AN IMAGE PROCESSING DEVICE, AND A PORTABLE DEVICE HAVING THE SAME

(75) Inventors: Woon-Sik Suh, Yongin-si (KR); Yang-Hoon Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 653 days.

(21) Appl. No.: 11/155,307

(22) Filed: Jun. 17, 2005

(65) Prior Publication Data

US 2005/0281548 A1 Dec. 22, 2005

(30) Foreign Application Priority Data

Jun. 17, 2004 (KR) .................... 10-2004-0044847

(51) Int. Cl.
  *G03B 17/00* (2006.01)
  *H04N 5/232* (2006.01)
(52) U.S. Cl. .................. 396/56; 396/57; 348/211.2
(58) Field of Classification Search ............ 396/56, 396/57; 348/211.1, 211.2, 211.3, 211.4, 348/211.6, 211.8
See application file for complete search history.

(56) References Cited

U.S. PATENT DOCUMENTS

| 6,738,572 B2 * | 5/2004 | Hunter | 396/56 |
| 6,963,363 B1 * | 11/2005 | Ohmura | 348/231.3 |
| 2003/0115474 A1 * | 6/2003 | Khan et al. | 713/186 |
| 2005/0064856 A1 * | 3/2005 | Atkin et al. | 455/418 |

FOREIGN PATENT DOCUMENTS

| JP | 2000-125173 | 4/2000 |
| JP | 2001-086449 | 3/2001 |
| JP | 2002-027554 | 1/2002 |
| KR | 1020010059725 A | 7/2001 |
| KR | 1020030016448 A | 3/2003 |

OTHER PUBLICATIONS

Chinese Office Action dated Oct. 31, 2008 in corresponding Chinese Appln. No. 200510091340.0.
Chinese Office Action dated Apr. 10, 2009 in corresponding Chinese Patent Appln. No. 200510091340.0.

* cited by examiner

*Primary Examiner*—Rochelle-Ann J Blackman
(74) *Attorney, Agent, or Firm*—F. Chau & Associates, LLC

(57) ABSTRACT

A method of controlling an image data output of a portable device, a portable device having a signal detection unit and image processing unit are provided. The signal detection unit generates a photographing-disabled mode signal in response to a restricted area signal. The image processing unit has a photographing-disabled mode decision unit, an authentication decision unit and a control unit. The photographing-disabled mode decision unit determines whether the portable device is in the photographing-disabled mode or not based on the photographing-disabled mode signal. The authentication decision unit determines whether the portable device is authenticated or not when the portable device is in the photographing-disabled mode. The control unit outputs first photographed image data when the portable device is authenticated, and prohibits an output of the first photographed image data when the portable device is not authenticated.

30 Claims, 6 Drawing Sheets

METHOD OF CONTROLLING AN IMAGE DATA OUTPUT OF A PORTABLE DEVICE, AN IMAGE PROCESSING DEVICE, AND A PORTABLE DEVICE HAVING THE SAME

CROSS-REFERENCE TO RELATED APPLICATION

This application claims priority to Korean Patent Application No. 2004-44847 filed on Jun. 17, 2004 in the Korean Intellectual Property Office (KIPO), the entire contents of which are hereby incorporated by reference.

TECHNICAL FIELD

The present invention relates to a portable device, and more particularly, to a portable device having a photographing-disabled mode.

DISCUSSION OF THE RELATED ART

Recently, a portable device such as a camera phone, which includes a camera module having a photographing function mounted thereon, has found widespread use. Such a portable device, however, has been shown to invade personal privacy due to its portability and relatively inconspicuous photographing capability.

When photographing is prohibited within a certain place such as a military intelligence area, a research institute, a secret area of a company, etc., some portable device users are prohibited from using their portable devices. However, it is difficult to distinguish users of portable devices that are prohibited from using their portable devices from those that are not prohibited from using their portable devices. In addition, there is a certain level of inconvenience associated with prohibiting all uses of portable devices within specific areas.

Therefore, there is a need for a method of selectively restricting the use of a portable device and a method of selectively permitting the use of a portable device within a specific area.

SUMMARY OF THE INVENTION

The present invention provides a method of controlling an image data output of a portable device by selectively restricting a photographing function of the portable device within a specific area. The present invention also provides an image processing device for the portable device and a portable device having the image processing device.

In some embodiments of the present invention, a method of controlling an image output of a portable device includes: receiving a restricted area signal from an external source; activating a photographing-disabled mode signal when the restricted area signal is received; determining whether the portable device is authenticated when the photographing-disabled mode signal is activated; and prohibiting an image processing unit in the portable device from outputting image data when the portable device is not authenticated.

In other embodiments of the present invention, an image processing device for use in a portable device includes: a photographing-disabled mode decision unit configured to determine whether the portable device is in a photographing-disabled mode; an authentication decision unit configured to determine whether the portable device is authenticated or not when the portable device is determined to be in the photographing-disabled mode; and a control unit configured to output first photographed image data when the portable device is determined to be an authenticated portable device, and configured to prohibit an output of the first photographed image data when the portable device is determined to be a non-authenticated portable device.

In still other embodiments of the present invention, a portable device includes: a signal detection unit configured to generate a photographing-disabled mode signal in response to a restricted area signal received from an external source; and an image processing unit comprising a photographing-disabled mode decision unit, an authentication decision unit and a control unit. The photographing-disabled mode decision unit determines whether the portable device is in the photographing-disabled mode based on the photographing-disabled mode signal. The authentication decision unit determines whether the portable device is authenticated or not when the portable device is determined to be in the photographing-disabled mode. The control unit outputs first photographed image data when the portable device is authenticated, and prohibits an output of the first photographed image data when the portable device is not authenticated.

BRIEF DESCRIPTION OF THE DRAWINGS

The above and other features of the present invention will become more apparent by describing in detail exemplary embodiments thereof with reference to the accompanying drawings, in which.

DESCRIPTION OF EXEMPLARY EMBODIMENTS

Figure 1:
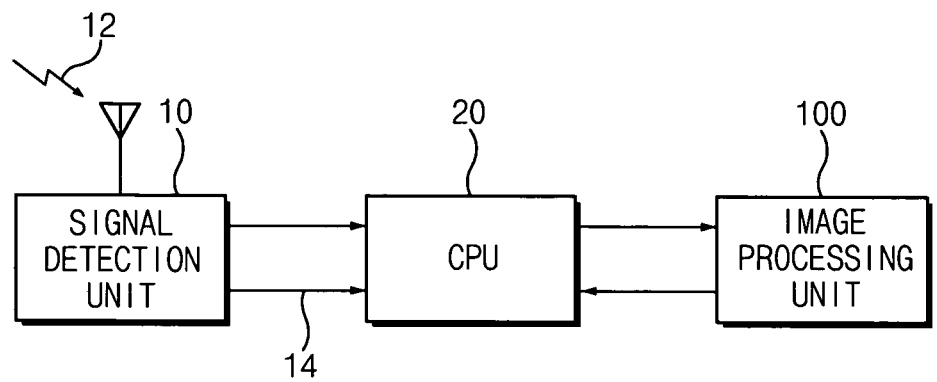
FIG. 1 is a block diagram illustrating a portable device having a photographing-disabled mode according to an exemplary embodiment of the present invention.

Detailed exemplary embodiments of the present invention are disclosed herein. However, specific structural and functional details disclosed herein are merely presented for purposes of describing the exemplary embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It should also be noted that in some alternative implementations, the functions/acts noted in the blocks may occur out of the order noted in the flowcharts. For example, two blocks shown in succession may in fact be executed substantially concurrently or the blocks may sometimes be executed in reverse order, depending upon the functionality/acts involved.

Figure 2:
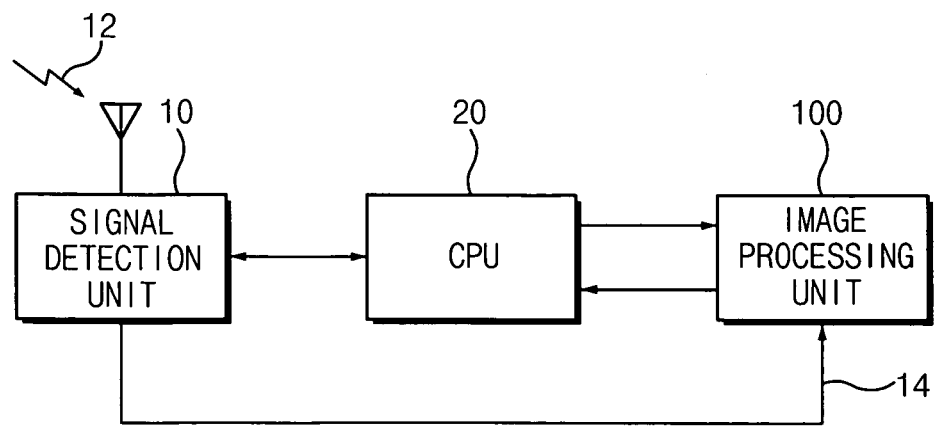
FIG. 2 is a block diagram illustrating a portable device having a photographing-disabled mode according to another exemplary embodiment of the present invention.

FIG. 1 is a block diagram illustrating a portable device having a photographing-disabled mode according to an exemplary embodiment of the present invention, and FIG. 2 is a block diagram illustrating a portable device having a photographing-disabled mode according to another exemplary embodiment of the present invention.

The portable device of FIG. 1 includes a central processing unit (CPU) 20 that directly controls an image data output of an image processing unit 100, and the portable device of FIG. 2 includes an image processing unit 100 that directly controls an image data output thereof without passing through a central processing unit (CPU) 20.

For example, the portable device may be a camera phone, a web camera or a digital camera having a photographing function.

Referring to FIG. 1, the portable device includes a signal detection unit 10, the central processing unit (CPU) 20 and the image processing unit 100.

The signal detection unit 10 receives a restricted area signal 12 from an external source when the portable device is within a photographing-prohibited area.

For example, the restricted area signal 12 may be a code signal having a predetermined frequency band. Additionally, the code signal may include an identifier of the portable device.

The signal detection unit 10 may receive the restricted area signal 12 from an external source via a wired communication or a wireless communication.

The signal detection unit 10 generates a photographing-disabled mode signal VMODE 14 in response to the restricted area signal 12, and provides the photographing-disabled mode signal VMODE 14 to the central processing unit (CPU) 20.

In other words, the photographing-disabled mode signal VMODE 14 may be generated in an internal logic circuit of the signal detection unit 10 when a code signal such as the restricted area signal 12 is detected.

The central processing unit (CPU) 20 controls the image processing unit 100 based on the photographing-disabled mode signal VMODE 14 to prevent the output of image data from the image processing unit 100.

In detail, the central processing unit (CPU) 20 may determine at a software level whether the portable device is in a photographing-disabled mode based on the photographing-disabled mode signal VMODE 14 and may provide a photographing prohibition command to the image processing unit 100 by installing firmware in the central processing unit (CPU) 20.

In addition, the central processing unit (CPU) 20 compresses a photographed image received from the image processing unit 100 to store the compressed image in a memory (not shown), and decompresses the compressed image.

The image processing unit 100 outputs image data using a charge-coupled device (CCD) image sensor or a complementary metal oxide semiconductor (CMOS) image sensor.

The image processing unit 100 determines whether the portable device is authenticated or not based on the photographing prohibition command and may prohibit image data from being output that corresponds to the photographed image according to the authentication result.

Additionally, the portable device can prevent a photographed image from being stored in a memory (not shown) of the portable device by prohibiting the image processing unit 100 such as a CMOS image sensor from outputting the image data.

Referring to FIG. 2, the image processing unit 100 determines whether the portable device is authenticated or not based on the photographing-disabled mode signal VMODE 14 generated from the signal detection unit 10, and can prohibit image data from being output that corresponds to the photographed image according to the authentication result.

In other words, the image processing unit 100 directly receives the photographing-disabled mode signal VMODE 14 from the signal detection unit 10 without passing through the central processing unit (CPU) 20, and disables a photographing function of the portable device.

The image processing unit 100 may be, for example, a CMOS image sensor or a CCD image sensor. It is apparent that the image processing unit 100 is not limited to a CMOS image sensor or a CCD image sensor, for example, the image processing unit 100 may be any other device that can photograph and produce an image.

Hereinafter, an image processing unit employing a CMOS image sensor of the portable device having a photographing-disabled mode is explained.

Figure 3:
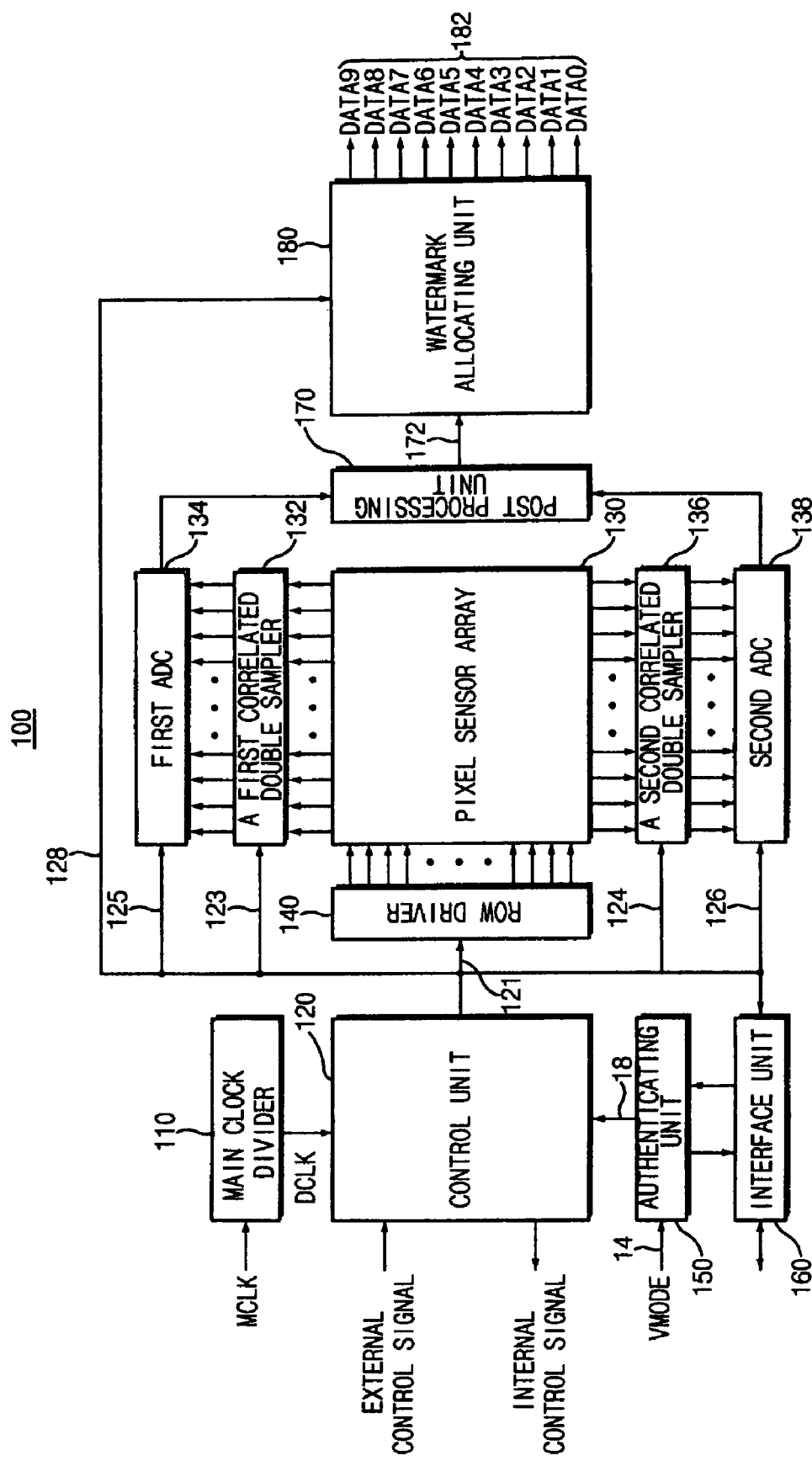
FIG. 3 is a block diagram illustrating an image processing unit including an image sensor according to an exemplary embodiment of the present invention.

FIG. 3 is a block diagram illustrating an image processing unit 100 including a CMOS image sensor according to an exemplary embodiment of the present invention.

Referring to FIG. 3, the image processing unit 100 including the CMOS image sensor includes a main clock divider 110, a control unit 120, a pixel sensor array 130, a row driver 140, a first correlated double sampler (CDS) 132, a second correlated double sampler (CDS) 136, a first analog-to-digital converter (ADC) 134, a second analog-to-digital converter (ADC) 138, a post-processing unit 170, an authenticating unit 150, an interface unit 160 and a watermark allocating unit 180.

The main clock divider 110 generates a data clock DCLK by dividing a main clock MCLK inputted from the image processing unit 100.

The image data of the image processing unit 100 and various synchronizing signals are synchronized with the data clock DCLK.

The authenticating unit 150 determines whether the portable device is authenticated or not based on a photographing prohibition command or a photographing-disabled mode signal VMODE 14, and provides a photographing prohibition signal 18 to the control unit 120. Detailed descriptions of the operation of the authenticating unit 150 will be explained later with reference to FIG. 4.

The control unit 120 receives external control signals, for example, a reset signal RSTN and a standby signal STBYN, and outputs control signals for controlling the row driver 140, the first correlated double sampler (CDS) 132, the second correlated double sampler (CDS) 136, the first ADC 134, the second ADC 138 and the watermark allocating unit 180.

The control signals include, for example, a vertical synchronizing signal VSYNC, a horizontal synchronizing signal HSYNC, the data clock DCLK and a plurality of timing signals 121, 123, 124, 125, 126 and 128.

Namely, the control unit 120 generates synchronizing signals, for example, VSYNC, HREF and DCLK signals, for prohibiting image data from being output from the image processing unit 100 in response to the photographing prohibition signal 18 provided from the authenticating unit 150.

For example, the control unit 120 controls the synchronizing signals, for example, the VSYNC, HREF and DCLK signals, to prohibit image data from being output from the image processing unit 100 when the photographing prohibition signal 18 has a value at an active level, and the control unit 120 controls the synchronizing signals, for example, the VSYNC, HREF and DCLK signals, to permit image data from being output from the image processing unit 100 when the photographing prohibition signal 18 has a value at an inactive level. Detailed descriptions of the operation of the image processing unit 100 will be explained later with reference to FIG. 5.

Additionally, the control unit 120 and the row driver 140 can prohibit image data from being output from the processing unit 100 by inactivating a plurality of row selection signals for selecting row lines in response to the photographing prohibition signal 18.

Furthermore, the control unit 120 can prohibit image data from being output from the processing unit 100 by inactivating the timing signal 121 provided to the row driver 140 in response to the photographing prohibition signal 18 provided from the authenticating unit 150. Here, when the timing signal 121 is inactivated, the row lines are not selected. As a result, the processing unit 100 does not output image data.

The pixel sensor array 130 is used to convert an image into an electric signal. The pixel sensor array 130 includes a plurality of row lines, a plurality of column lines and a plurality of pixels formed in a pixel area that is defined by the plurality of row lines and the plurality of column lines.

For example, each of the pixels of the pixel sensor array 130 (e.g., the CMOS image sensor) may include a photo diode, a charge amplifier for amplifying an output of the photo diode and an MOS transistor coupled to the row lines which, when a row line is selected, is turned on to provide an output signal of the photo diode to the column line.

The row driver 140 collects an analog image signal from pixels coupled to the activated row line by activating a row line of the pixel sensor array 130 in response to a first timing signal 121 outputted from the control unit 120.

The first correlated double sampler (CDS) 132 and the second correlated double sampler (CDS) 136 perform a correlated double sampling process on analog signals picked-up from the column lines in response to a second timing signal 123 and a third timing signal 124, and remove a temporal random noise and/or fixed pattern noise (FPN) included in the picked-up analog image signal.

A temporal noise is generated when pixels perform a reset operation. For example, the first correlated double sampler (CDS) 132 removes a noise included in an analog image signal outputted from odd numbered column lines, and the second correlated double sampler (CDS) 136 removes a noise included in an analog image signal outputted from even numbered column lines.

The first ADC 134 and the second ADC 138 convert analog image signals received from the first correlated double sampler (CDS) 132 and the second correlated double sampler (CDS) 136 into digital image signals respectively in response to each of a fourth timing signal 125 and a fifth timing signal 126 provided from the control unit 120.

The post-processing unit 170 outputs a first image data signal 172 by performing an image process such as a color correction and gamma correction after receiving digital image signals from the first ADC 134 and the second ADC 138.

The watermark allocating unit 180 outputs second image data 182 composed of 10 bits of image data DATA0 to DATA9 by allocating a watermark to the first image data 172 outputted from the post-processing unit 170.

The interface unit 160 interfaces the image processing unit 100 with the central processing unit (CPU) 20. For example, the interface unit 160 may employ an I²C bus interface, e.g., a serial two-wire half duplex interface that features a bi-directional operation, and master or slave mode.

The second image data 182 generated from the image processing unit 100 may be provided to the central processing unit (CPU) 20 via the interface unit 160 based on the timing of various synchronizing signals such as the VSYNC, HREF and DCLK signals.

Alternatively, the image processing unit 100 may remove a noise included in an analog image signal outputted from odd numbered and even numbered column lines by employing one correlated double sampler (CDS) instead of two correlated double samplers (CDSs).

Alternatively, the image processing unit 100 may convert an analog image signal outputted from a correlated double sampler (CDS) into a digital image signal by employing one analog-to-digital converter (ADC) instead of two analog-to-digital converters (ADCs).

Figure 4:
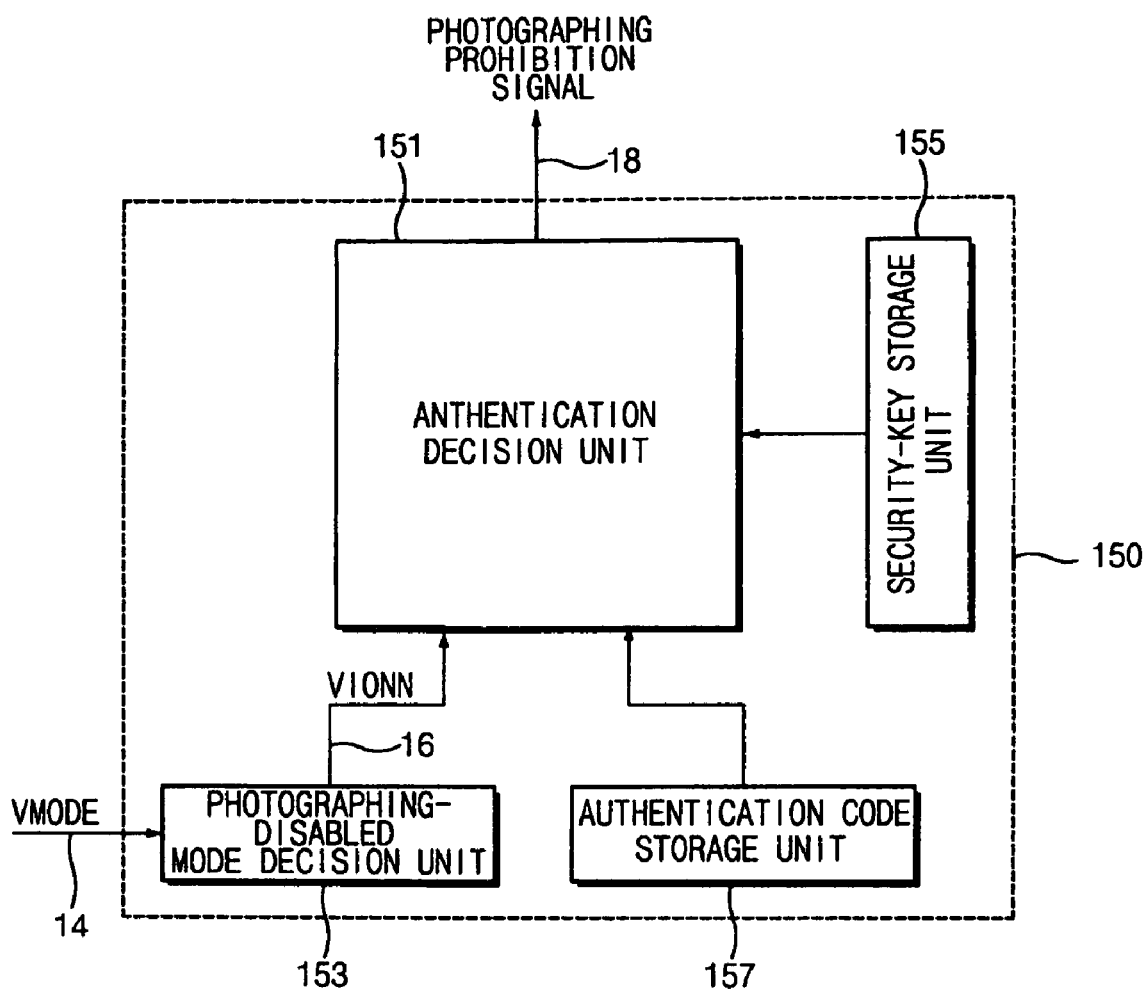
FIG. 4 is a block diagram illustrating an authenticating unit of FIG. 3 according to an exemplary embodiment of the present invention.

FIG. 4 is a block diagram illustrating the authenticating unit 150 of FIG. 3 according to an exemplary embodiment of the present invention.

Referring to FIG. 4, the authenticating unit 150 includes an authentication decision unit 151, a photographing-disabled mode decision unit 153, a security key storage unit 155 and an authentication code storage unit 157.

The photographing-disabled mode decision unit 153 determines whether a photographing-disabled mode signal VMODE 14 has an active state or not.

When a photographing-disabled mode signal VMODE 14 outputted from the signal detection unit 10 has an active state, the photographing-disabled mode decision unit 153 regards a portable device as being in the photographing-disabled mode and generates an authentication start signal VIONN 16 to provide the authentication start signal VIONN 16 to the authentication decision unit 151.

For example, the authentication start signal may include an identifier of a portable device having a serial number, etc.

The security key storage unit 155 stores a security key previously allocated to a portable device. The security key is generated using portable device information including a serial number, etc., of a portable device.

The authentication code storage unit 157 stores an authentication code issued by an image photographing authorizer. The authentication code allows only a previously permitted portable device to photograph an image.

For example, the authentication code may be stored in the authentication code storage unit 157 of the authenticating unit 150. Alternatively, when a portable device is within a restricted area, the authentication code and a restricted area signal may be transmitted to the authentication code storage unit 157 via the interface unit 160 and then the authentication code may be stored in the authentication code storage unit 157.

The authentication decision unit 151 determines whether the portable device is authenticated or not using the authentication code and the security key in response to the authentication start signal VIONN 16, and generates a photographing prohibition signal 18 to provide the photographing prohibition signal 18 to the control unit 120 according to the decision result.

In detail, when the portable device is regarded as being authenticated based on the decision result, the authentication decision unit 151 inactivates the photographing prohibition signal 18, and when the portable device is regarded as not being authenticated based on the decision result, the authentication decision unit 151 activates the photographing prohibition signal 18.

Figure 5:
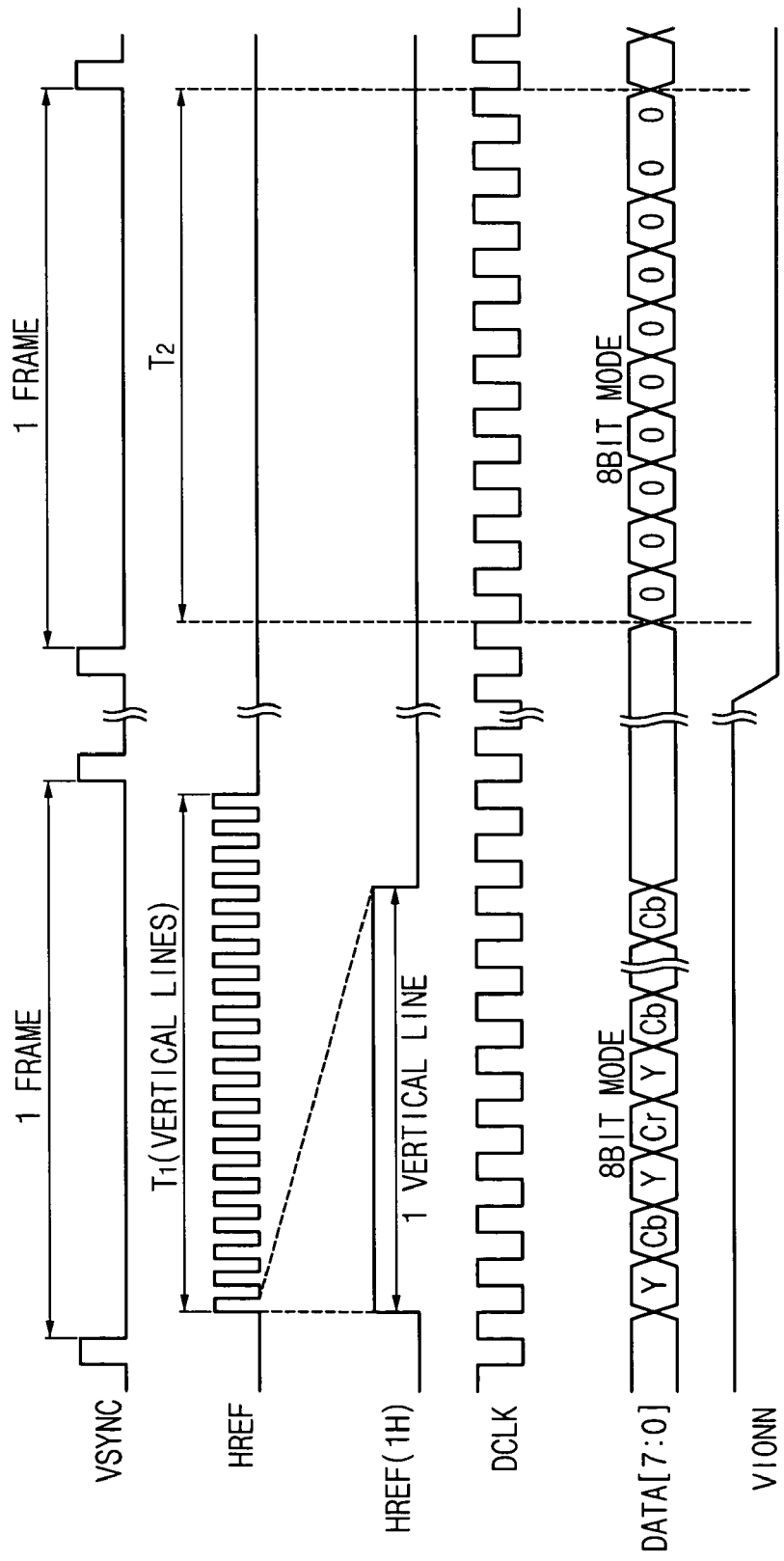
FIG. 5 is a timing diagram illustrating an operation of an image processing unit having a photographing-disabled mode according to an exemplary embodiment of the present invention.

FIG. 5 is a timing diagram illustrating an operation of the image processing unit 100 having a photographing-disabled mode according to an exemplary embodiment of the present invention.

A vertical synchronizing signal VSYNC represents the start of a frame that corresponds to a scene of an image. HREF signals corresponding to the number of column lines are generated between adjacent pulses of the vertical synchronizing signal VSYNC. The HREF signal is a synchronizing signal that activates each of the column lines.

When the HREF signal is activated (T1 section), image data DATA [7:0] are normally collected via a column line and the image data DATA [7:0] are outputted from the image processing unit 100, and when the HREF signal is inactivated (T2 section), the image data DATA [7:0] are not outputted from the image processing unit 100.

The DCLK signal is a clock signal that is generated by dividing the MCLK signal by the main clock divider 110 of FIG. 1, and Y, Cb and Cr signals of the image data DATA [7:0] are synchronized with the DCLK signal to be outputted.

The Y signal of the image data DATA [7:0] is a luminance signal representing a brightness of an image, and the Cb and Cr signals are color difference signals representing a color difference between the signal Y and RGB (Red, Green, and Blue) color signals.

As illustrated in FIG. 5, the authentication start signal VIONN 16 has a high level when the portable device is at a normal operation mode, and the authentication start signal VIONN 16 has a low level when the portable device is at a photographing-disabled mode.

Alternatively, the authentication start signal VIONN 16 may have a low level when the portable device is at a normal operation mode, and the authentication start signal VIONN 16 may have a high level when the portable device is at a photographing-disabled mode.

When the authentication start signal VIONN 16 has a low level and the photographing prohibition signal 18 is activated, because the portable device is not authenticated by the authenticating unit 150, the HREF signal is inactivated (T2 section). As a result, the image data DATA [7:0] are not outputted from the image processing unit 100.

When the HREF signal is activated (T1 section), the image data DATA [7:0] are collected and are normally outputted from the image processing unit 100.

Figure 6:
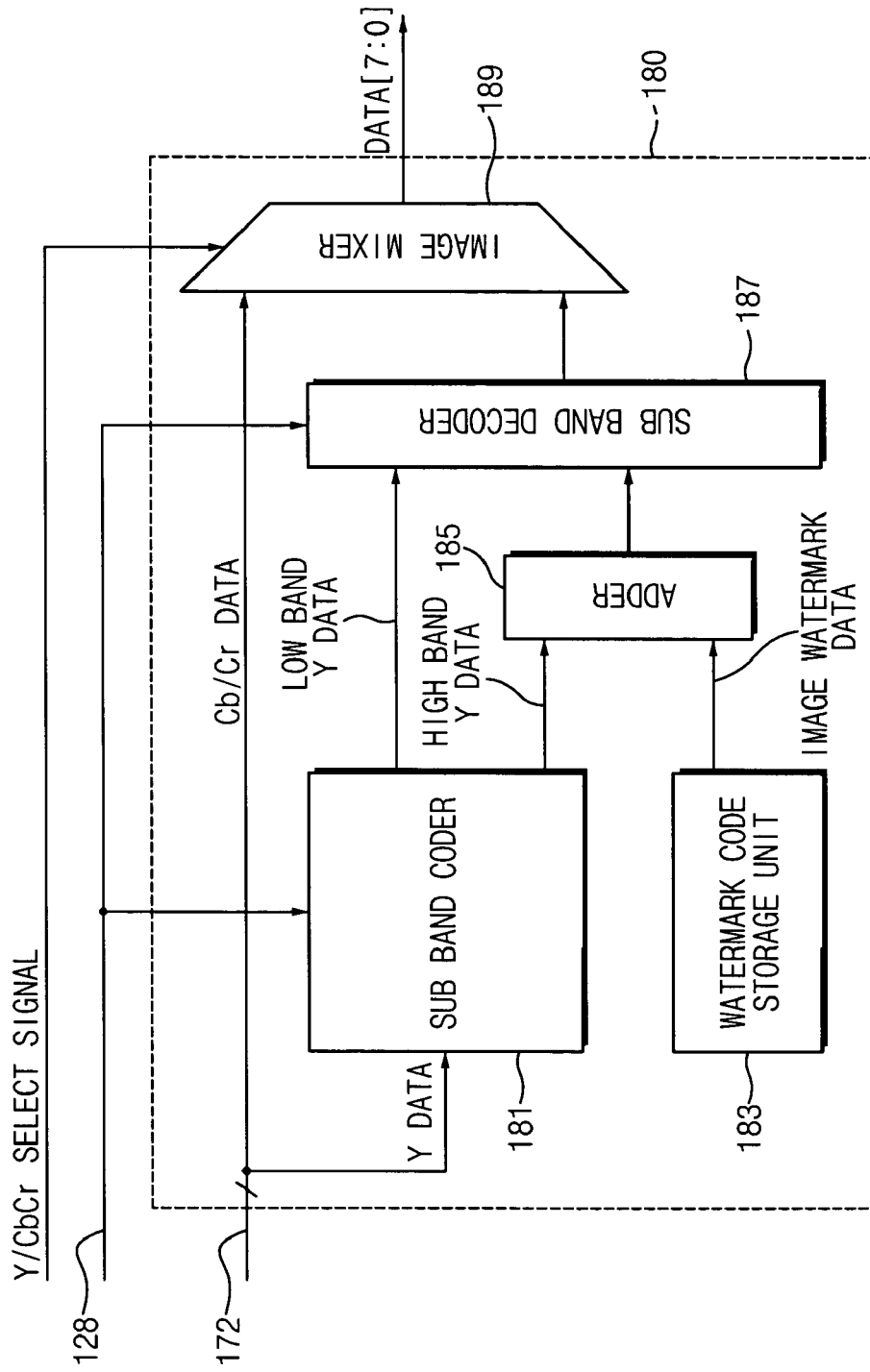
FIG. 6 is a block diagram illustrating a watermark allocating unit of FIG. 3 according to an exemplary embodiment of the present invention.

FIG. 6 is a block diagram illustrating the watermark allocating unit 180 of FIG. 3 according to an exemplary embodiment of the present invention.

Referring to FIG. 6, the watermark allocating unit 180 includes a sub band coder 181, a watermark code storage unit 183, an adder 185, a sub band decoder 187 and an image mixer 189.

The sub band coder 181 receives Y data of first image data outputted from the post-processing unit 170 to divide the Y data into a high band component and a low band component, and outputs high band Y data and low band Y data.

For example, the Y data signal may be divided into a high band component and a low band component using a wavelet transform.

The watermark code storage unit 183 stores watermark image data including a unique signature assigned according to a portable device.

The adder 185 adds watermark image data to the high band component of the Y data signal and outputs the added result.

The sub band decoder 187 receives the low band component of the Y signal and an output of the adder 185 to combine each of the sub band images. In other words, the sub band decoder 187 outputs the low band component of the Y signal combined with a Y component including a high band watermark code.

The image mixer 189 receives Cb/Cr signals of the first image data 172 and an output signal of the sub band decoder 187, and sequentially outputs Y, Cr and Cb signals having watermark image data in response to a select control signal, e.g., a Y, Cr, Cb select signal. For example, the image mixer 189 may include a multiplexer.

Figure 7:
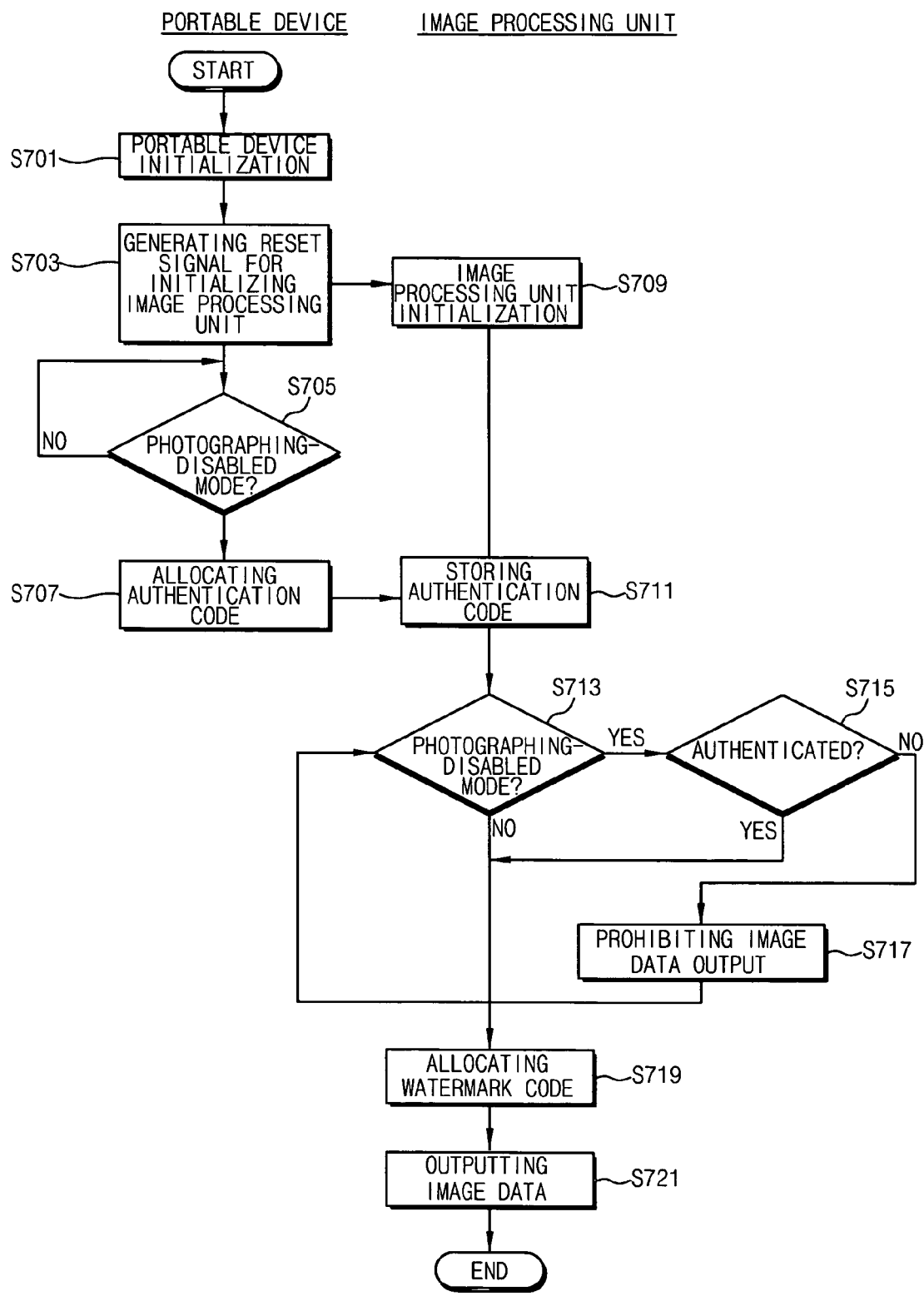
FIG. 7 is a flowchart illustrating an operation of an image processing unit having a photographing-disabled mode according to an exemplary embodiment of the present invention.

FIG. 7 is a flowchart illustrating an operation of the image processing unit 100 having a photographing-disabled mode.

Referring to FIG. 7, a portable device is initialized (step S701). A signal, for example, a reset signal RSTN for initializing the image processing unit 100 is generated (step S703).

The image processing unit 100 is initialized based on the reset signal RSTN to photograph an image (step S709).

The portable device determines whether the portable device is at a photographing-disabled mode by checking whether a photographing-disabled mode signal VMODE 14 has an active state (step S705).

When the photographing-disabled mode signal VMODE 14 has the active state, the portable device is regarded to be in a photographing-disabled mode and an authentication code is allocated (step S707).

The image processing unit 100 receives the authentication code via the I$^2$C interface 160 to store the authentication code in the authentication code storage unit 157 (step S711).

Alternatively, the authentication code may have previously been stored in the authentication code storage unit 157.

The image processing unit 100 determines whether the portable device is at a photographing-disabled mode by checking whether the photographing-disabled mode signal VMODE 14 has an active state (step 713).

When the decision result represents a photographing-disabled mode, the authentication start signal VIONN 16 is generated and the authentication decision unit 151 of FIG. 4 determines whether the portable device is authenticated or not using an identifier of the portable device, an authentication code and a security code (step S715).

When the portable device is not authenticated, the processing unit 100 prohibits image data from being output using the various synchronizing signals such as the VSYNC, HREF and DCLK signals (step S717).

When the decision result of the step S713 does not represent a photographing-disabled mode or when the decision result of the step 715 is not authenticated, the portable device operates in a normal mode.

Namely, when the portable device is in the normal mode, the image processing unit 100 allocates a watermark code to the first image data 172 (step S719) and outputs the second image data (step S721).

A portable device having a photographing-disabled mode according to an exemplary embodiment of the present invention may protect personal privacy and the security of a company. For example, because an authenticating unit included in a CMOS image sensor performs an authentication process at a hardware level on a portable device, during a photographing-disabled mode, only previously permitted portable devices can photograph an image.

Additionally, when a portable device is within a photographing-restricted area and a portable device goes into a photographing-disabled mode, a portable device is authenticated at a hardware level through an authentication process using an authentication key. Thus, a portable device having a photographing-disabled mode may improve security.

Further, the portable device having a photographing-disabled mode prohibits image data from being output from an image processing unit. As a result, photographed image data may not be temporarily stored in a memory of a portable device and may not remain in the portable device. Furthermore, when a portable device is not in a photographing-disabled mode or when the portable device is in a normal operation mode where the portable device in the photographing-disabled mode is not authenticated, image contents of the portable device may be protected by allocating a watermark code to image data.

While the exemplary embodiments of the present invention have been described in detail, it should be understood that various changes, substitutions and alterations may be made herein without departing from the scope of the invention.

What is claimed is:

1. A method of controlling an image output of a portable device, comprising:
    wirelessly receiving, at the portable device, a restricted area signal and an authentication code from an external source when the portable device is within a photographing prohibited area, wherein the authentication code only allows a portable device identified thereby to output image data when it is in the photographing prohibited area;
    activating, in the portable device, a photographing-disabled mode signal when the restricted area signal is received;
    determining, in the portable device, whether the portable device is authenticated or not when the photographing-disabled mode signal is activated, wherein the portable device is determined to be authenticated or not by using the authentication code and a security key stored in the portable device, which contains the identity of the portable device; and
    prohibiting, at the portable device, an image processing unit in the portable device from outputting image data when the portable device is not authenticated.

2. The method of claim 1, wherein the step of determining comprises:
    allocating the authentication code to the portable device.

3. The method of claim 2, wherein the step of determining further comprises:
    generating an authentication start signal including identifier information of the portable device when the photographing-disabled mode signal is activated.

4. The method of claim 3, wherein the step of
    determining whether the portable device is authenticated or not using the authentication code and the security key is performed in response to the authentication start signal.

5. The method of claim 3, wherein the step of prohibiting comprises:
    inactivating a synchronizing signal for activating each column line coupled to a plurality of pixels of the image processing unit, and prohibiting the image processing unit from outputting the image data while the synchronizing signal is inactivated.

6. The method of claim 3, wherein the step of prohibiting further comprises:
    prohibiting the image processing unit from outputting the image data by inactivating row lines coupled to a plurality of pixels of the image processing unit.

7. The method of claim 1, further comprising:
    outputting second image data as the image data by adding a watermark code to first photographed image data when the portable device is determined to be an authenticated portable device.

8. The method of claim 7, wherein the step of outputting second image data comprises:
    extracting a high band component from a Y signal of the first photographed image data representing brightness and adding watermark image data to the high band component.

9. The method of claim 8, wherein the step of outputting second image data comprises:
    receiving the Y signal representing brightness to divide the Y signal into the high band component and a low band component and outputting high band Y data and low band Y data;
    adding watermark image data to the high band Y data;
    combining the high band Y data, into which the watermark image data is added, with the low band Y data to generate a decoded Y signal; and
    sequentially outputting the decoded Y signal and a color difference signal between the decoded Y signal and the first photographed image data in response to a predetermined select control signal.

10. The method of claim 1, wherein the image processing unit includes one of a CMOS image sensor and a charge coupled device (CCD).

11. An image processing device for use in a portable device, comprising:
    a photographing-disabled mode decision unit configured to determine whether the portable device is in a photographing-disabled mode;
    an authentication decision unit configured to determine whether the portable device is authenticated or not when the portable device is determined to be in the photographing-disabled mode; and
    a control unit configured to output first photographed image data when the portable device is determined to be an authenticated portable device, and configured to prohibit an output of the first photographed image data when the portable device is determined to be a non-authenticated portable device,
    wherein the image processing device is part of the portable device,
    wherein the photographing-disabled mode decision unit determines whether the portable device is in a photographing-disabled mode in response to a restricted area signal that is wirelessly received by the portable device from an external source when the portable device is within a photographing prohibited area,
    wherein the portable device further wirelessly receives an authentication code from the external source when the portable device is within the photographing prohibited area,
    wherein the authentication code only allows a portable device identified thereby to output image data when it is in the photographing prohibited area, and
    wherein the portable device is determined to be authenticated or not by using the authentication code and a security key stored in the portable device, which contains the identity of the portable device.

12. The image processing device of claim 11, wherein the photographing-disabled mode decision unit determines the portable device to be in the photographing-disabled mode to generate an authentication start signal when a photographing-disabled mode signal is generated in response to the restricted area signal having an active state.

13. The image processing device of claim 12, wherein the authentication decision unit determines whether the portable device is authenticated or not using the authentication code and the security key in response to the authentication start signal.

14. The image processing device of claim 12, wherein the authentication start signal includes identifier information corresponding to the portable device.

15. The image processing device of claim 11, wherein the control unit inactivates a synchronizing signal for activating column lines coupled to a plurality of pixels of the image processing device when the portable device is determined to be a non-authenticated portable device, and controls the image processing device to not output the first photographed image data while the synchronizing signal is inactivated.

16. The image processing device of claim 11, wherein the control unit controls the image processing device to not output the first photographed image data by inactivating row lines coupled to a plurality of pixels of the image processing device.

17. The image processing device of claim 11, wherein the image processing device further comprises:
a watermark allocating unit configured to add a watermark code to the first photographed image data and to output second image data when the portable device is determined to be the authenticated portable device.

18. The image processing device of claim 17, wherein the watermark allocating unit enacts a high band component from a Y signal of the first photographed image data representing brightness and adds watermark image data to the high band component.

19. The image processing device of claim 18, wherein the watermark allocating unit comprises:
a sub band coder configured to receive the Y signal representing brightness to divide the Y signal into the high band component and a low band component and configured to output high band Y data and low band Y data;
an adder configured to add the watermark image data to the high band Y data;
a sub band decoder configured to combine the low band Y data with the high band Y data into which the watermark image data is added to generate a decoded Y signal; and
an image mixer configured to sequentially output the decoded Y signal and a color difference signal between the decoded Y signal and the first photographed image data based on a predetermined select control signal.

20. The image processing device of claim 11, wherein the image processing device further comprises:
a pixel sensor array including a plurality of row lines, a plurality of column lines and a plurality of pixels formed in an area defined by the row lines and the column lines, the pixel sensor array for converting an image to an electrical signal;
a row driver configured to activate the row lines in response to a first timing signal provided from the control unit;
a correlated double sampler configured to provide a second analog image signal by substantially removing a temporal random noise or a fixed pattern noise (FPN) included in a first analog image signal outputted from the pixel sensor array in response to a second timing signal provided from the control unit;
an analog-to-digital converter configured to convert the second analog image signal into a digital image signal in response to a third timing signal provided from the control unit; and a post-processing unit configured to receive the digital image signal from the analog-to-digital converter and configured to perform a color correction or a gamma correction to provide the first image data.

21. The image processing device of claim 11, wherein the image processing device includes a CMOS image sensor.

22. A portable device, comprising:
a signal detection unit configured to generate a photographing-disabled mode signal in response to a restricted area signal received from an external source when the portable device is within a photographing prohibited area, wherein the signal detection unit further receives an authentication code from the external source when the portable device is within the photographing prohibited area, and wherein the authentication code only allows a portable device identified thereby to output image data when it is in the photographing prohibited area; and
an image processing unit comprising a photographing-disabled mode decision unit, an authentication decision unit and a control unit,
wherein the photographing-disabled mode decision unit determines whether the portable device is in the photographing-disabled mode based on the photographing-disabled mode signal,
wherein the authentication decision unit determines whether the portable device is authenticated or not when a state of the portable device is determined to be in the photographing-disabled mode,
wherein the portable device is determined to be authenticated or not by using the authentication code and a security key stored in the portable device, which contains the identity of the portable device, and
wherein the control unit outputs first photographed image data when the portable device is authenticated, and prohibits an output of the first photographed image data when the portable device is not authenticated.

23. The portable device of claim 22, wherein the photographing-disabled mode decision unit generates an authentication start signal when the portable device is determined to be in the photographing-disabled mode, and wherein the authentication decision unit determines whether the portable device is authenticated or not using the authentication code and the security key in response to the authentication start signal.

24. The portable device of claim 22, wherein the control unit inactivates a predetermined synchronizing signal when the portable device is determined to not be an authenticated portable device, and prohibits first photographed image data from being output from the image processing unit while the predetermined synchronizing signal is inactivated.

25. The portable device of claim 22, wherein the processing unit further comprises:
a watermark allocating unit configured to add a watermark code to the first photographed image data when the portable device is determined to be an authenticated portable device and configured to output second image data.

26. The portable device of claim 25, wherein the watermark allocating unit extracts a high band component from a Y signal of the first image data representing brightness and adds watermark image data to the high band component.

27. The portable device of claim 26, wherein the watermark allocating unit comprises:
a sub band coder configured to receive the Y signal representing brightness to divide the Y signal into a high band component and a low band component and configured to output high band Y data and low band Y data;

an adder configured to add watermark image data to the high band Y data;

a sub band decoder configured to combine the low band Y data with the high band Y data where the watermark image data is added to generate a decoded Y signal; and an image mixer configured to sequentially output the decoded Y signal and a color difference signal between the decoded Y signal and the first photographed image data based on a predetermined select control signal.

28. The portable device of claim 22, wherein the portable device further comprises:

a central processing unit (CPU), which compresses photographed image data provided from the image processing unit to store the first photographed image data.

29. The portable device of claim 22, wherein the portable device further comprises:

a central processing unit (CPU), which provides a photographing prohibition command to the photographing-disabled mode decision unit in response to the photographing-disabled mode signal, and wherein the photographing-disabled mode decision unit determines whether the portable device is in the photographing-disabled mode based on the photographing prohibition command.

30. The portable device of claim 22, wherein the processing device further comprises:

a pixel sensor array including a plurality of row lines, a plurality of column lines and a plurality of pixels formed in a region defined by the row lines and the column lines, the pixel sensor array for converting an image to an electrical signal;

a row driver configured to activate the row lines in response to a first timing signal provided from the control unit;

a correlated double sampler configured to provide a second analog image signal by substantially removing a temporal random noise or a fixed pattern noise (FPN) included in a first analog image signal outputted from the pixel sensor array in response to a second timing signal provided from the control unit;

an analog-to-digital converter configured to convert the second analog image signal into a digital image signal in response to a third timing signal provided from the control unit;

a post-processing unit configured to receive the digital image signal from the analog-to-digital converter and perform a color correction or a gamma correction to provide the first photographed image data; and an interface unit configured to interface the image processing unit with the central processing unit (CPU).

* * * * *